Feb. 24, 1970
B. VER NOOY
3,496,588
PIPELINE PIG
Filed June 26, 1967
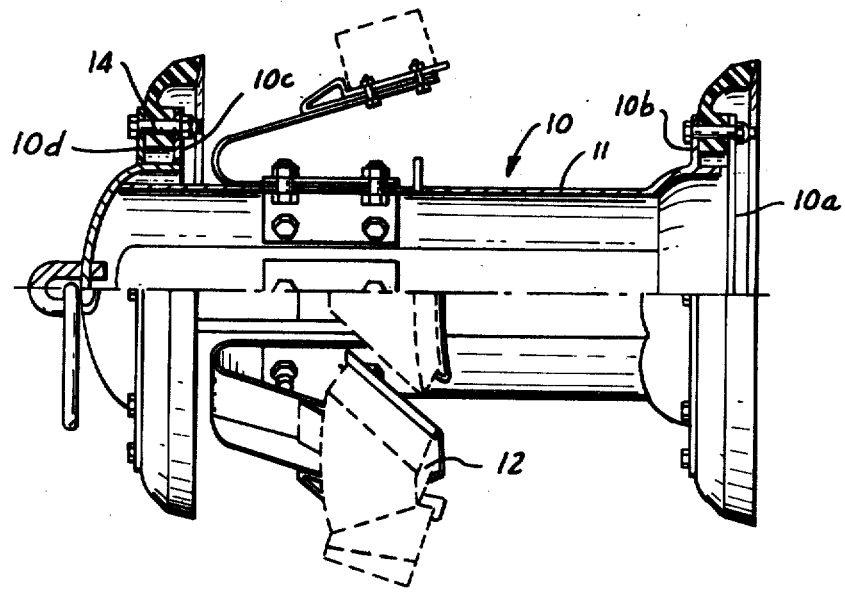
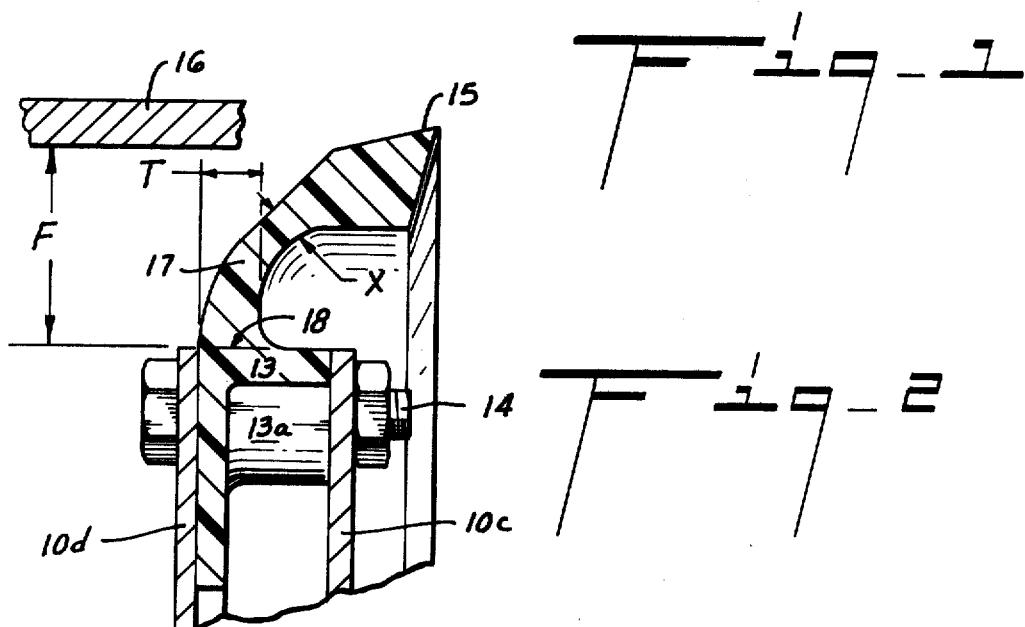
BURTON VER NOOY
INVENTOR.
BY
ATTORNEYS

United States Patent Office 3,496,588
Patented Feb. 24, 1970

3,496,588
PIPELINE PIG
Burton Ver Nooy, Broken Arrow, Okla., assignor to
T. D. Williamson Inc., Tulsa, Okla.
Filed June 26, 1967, Ser. No. 648,849
Int. Cl. B08b 9/04
U.S. Cl. 15—104.06                        5 Claims

ABSTRACT OF THE DISCLOSURE

The invention relates to a pig and a cup wherein the cup is of a configuration permitting it to be constructed from polyurethane or a material having the resiliency and abrasion characteristics of polyurethane. The cup has a lip portion joined to a body portion by a flexible web. The latter is shaped so that substantially all of the lip portion lies behind the body portion.

---

This invention relates to a pipeline pig and particularly to a one having an improved cup for supporting or helping support the body of the pig in the pipeline and for forming a sliding and sealing engagement with the inner wall of the pipeline.

The pipeline industry uses pipeline pigs for many purposes. Some of the pigs carry brushes or scraping elements and are used to clean the inner walls of the pipeline. Others do not carry any cleaning elements and may be used as separation pigs to separate two different fluids being consecutively passed through the pipeline. Similarly, such pigs can be used as contractor's pigs to clean loose debris from the pipeline and to remove any fluids existing at low spots in the pipeline. Pigs are also used for other purposes and it will be understood that this invention is applicable to any type of pig without regard to the intended function of the pig in the pipeline.

These pigs employ cups which extend annularly from the main pig body to the wall of the pipeline to form a sliding seal with the wall in order that the fluid flowing through the pipeline can propel the pigs along the same. The cups also, in many cases, help support the main pig body centrally of the pipeline. Heretofore, these cups have been made of rubber. Due to the pigs travelling many miles through the pipeline with the cups in engagement with the frequently rough walls of the pipeline, the cups have not had as long a service life as might be desired and required rather frequent replacement in many instances. Efforts have been made to substitute other materials for rubber but these have not been successful for one reason or another. For example, it was suggested that polyurethane be substituted for rubber. However, when cups constructed of polyurethane and of the same configuration as the rubber cups were tried, they did not perform satisfactorily due to the different characteristics of the polyurethane. A successful pig having polyurethane cups has not been available and it is an object of this invention to provide a pig having a special shape of cup made of a material having the resilient and abrasion resistant characteristics or properties of polyurethane whereby the cups have an increased life as compared with rubber and yet function properly to permit the pig to be propelled through the pipeline in the same or better manner as it would have been using rubber cups.

Another object of this invention is to provide a pig cup having a lip type seal arranged so that it will slide smoothly along the pipeline without excessive friction and without chattering.

Another object is to provide such a cup, and a pig using same, which can be made of polyurethane or the like and yet which will accommodate irregularities in the interior of the pipe, such as out-of-round sections, variations in diameters, etc. despite the fact that polyurethane has less resiliency than rubber.

Other advantages, features and objects of the invention will be apparent to one skilled in the art upon consideration of the specification, the claims and the attached drawings wherein:

FIG. 1 is a side view, partially in elevation and partially in section, of one form of pig embodying the invention; and FIG. 2 is an enlarged sectional view of the cup and cup flanges shown at the top of FIG. 1.

As indicated above, the pig body 10 can be of any desired construction and is here shown to include a hollow cylindrical section 11 for carrying a plurality of brushes 12. The illustrated pig also has two pairs of cup flanges 10a through 10d.

Since the forward and rear cups of the pigs shown in FIG. 1 are identical, only the forward cup will be described.

The cup is of a one-piece or unitary structure and includes a body portion 13 which is clamped between the cup flanges and which includes a plurality of cylindrical portions 13a each of which has a hole therethrough to receive a bolt 14.

The cup also has a lip portion 15 for sealingly and slidingly engaging an inner wall of a pipeline indicated at 16. It will be noted that the relaxed outside diameter of the lip portion 15 is slightly greater than the inside diameter of the pipeline in order to obtain an initial seal therebetween when the pig is inserted in the pipeline.

The cup also has a web portion 17 integrally joining the body portion 13 and the lip portion 15. The web portion is shaped so as to position substantially all of the lip portion to the rear of the juncture 18 of the web portion with the body portion. Thus, the contact of the lip portion with the pipeline is behind the cup body portion and also the web portion. This provides a radially flexible cup lip portion having good wear qualities even though the polyurethane is relatively stiff as compared to rubber. Also, the web portion 17 has a flexing section intermediate the body and lip portions and generally lying in the region of the arrows marked X.

It will be noted that the body portion at the juncture 18 and the cup flanges 10c and 10d are of substantially lesser diameter than the inside diameter of the pipeline. This difference F is selected so that the part of the cup extending radially beyond the cup flanges and juncture 18 can be made sufficiently long that the required radial flexure of the lip portion can be obtained and yet is not long enough that expected differentials of pressure across the lip, when the pig encounters an obstacle in the pipeline, will be sufficient to cause the cup to reverse, that is, to have its lip portion 15 blown by flange 10b so as to effectively reverse the configuration of the cup.

The thickness X of the web portion should be selected so that the required radial flexure of lip portion 15 can be obtained to permit the pig to pass minor obstacles in the pipeline and also to maintain a seal around the entire periphery of the cup in out-of-round spots in the pipeline. On the other hand, the thickness should not be so small that the cup cannot support its assigned portion or all, as the case may be, of the weight of the pig body or so small that expected differentials across the cup would permit the lip portion to reverse as explained above.

It will be noted that the lip portion 15 is of considerable thickness. It should be thick enough so that the pressure differential normally encountered across the cup does not press the lip against the pipe to excessively increase friction and wear.

With the foregoing construction, the lip portion 15 will be able to move generally radially by bending or flexing the web portion in the general region of the arrows X. In effect, then, the relatively inflexible lip and body portions are joined by a flexible portion which permits the lip portion to move relative to the body portion.

While one skilled in the art can make an effective embodiment of this invention considering the design parameters disclosed above, it might be helpful to discuss dimensional relationships of the cup. For example, optimum results have been achieved when the thickness T of the cup at the juncture 18 between the body and web portions is about one-fourth of the distance F between the cup flanges or the outer part of the body portion to the inner wall of the pipeline. Also, the minimum cup thickness X of the flexing section of the web portion should be about one-half of the thickness T. These dimensional formulae are suggested merely as a guide and there can be some variation from them with corresponding changes in results.

The material from which the cup is fabricated is one which has the resilient and abrasion resistance characteristics of polyurethane. Polyurethane of a durometer of 65 to 85 is preferred.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a pig adapted to be pushed through a pipeline by fluid flowing through the pipeline wherein a pig body is adapted to be inserted into a pipeline, the improvement comprising a cup of a material having the resilient and abrasion resistant properties of polyurethane for supporting the pig body in a pipeline and for forming a sliding seal with an inner wall of the pipeline, said cup having (a) a body portion fastened to said pig body, (b) a lip portion initially having an annular substantially flat surface for sealingly and slidingly engaging an inner wall of a pipeline, the lip portion having a relaxed outside diameter slightly greater than the inside diameter of the pipeline, and (c) a web portion integrally joining said body and said lip portion and, when in a relaxed state, extending rearwardly of said body portion so as to position substantially all of said lip portion to the rear of the juncture of the web portion with the body portion, said body portion at its juncture with the web portion having a diameter substantially less than the inner diameter of a pipeline through which the pig is to be passed, said web portion having a flexing section spaced from said body portion and located adjacent said lip portion.

2. In a pig adapted to be pushed through a pipeline by fluid flowing through the pipeline wherein a central pig body is adapted to a inserted into a pipeline, the improvement comprising a rigid annular flange carried by the pig body and having an outer diameter substantially less than the inner diameter of a pipeline through which the pig is to be passed and also having a forward face, and a cup of material having the resilient and abrasion properties of polyurethane for supporting the pig body in a pipeline and for forming a sliding seal with an inner wall of a pipeline, said cup having (a) a body portion engaging the forward face of said flange, (b) a lip portion initially having an annular substantially flat surface for sealingly and slidingly engaging an inner wall of a pipeline, the lip portion having a relaxed outside diameter slightly greater than the inside diameter of the pipeline, and (c) a web portion integrally joining said body and lip portions and, when in a relaxed state, extending rearwardly of said body portion so as to position substantially all of said lip portion to the rear of the web portion at its juncture with the body portion, said web portion at its juncture with the body portion having a thickness T of about one-fourth of the radial clearance between the flange and a pipeline in which the pig is to be used, said web portion having a flexing section spaced from said body portion and located adjacent said lip portion which flexing section has a minimum thickness of about one-half of T.

3. The pig of claim 2 wherein said lip portion has a thickness greater than that of said flexing section.

4. A cup for use on a pipeline pig comprising a unitary annular structure of a material having the resilient and abrasion resistant properties of polyurethane and having (a) body portion for engaging a radial extending annular surface of a pig body, (b) a lip portion initially having an annular substantially flat surface for sealingly and slidingly engaging an inner wall of a pipeline, the lip portion having a relaxed outside diameter slightly greater than the inside diameter of the pipeline, and (c) a web portion integrally joining said body and lip portions and, when in a relaxed state, extending rearwardly of the body portion so as to position substantially all of said lip portion to the rear of the juncture of the web portion with the body portion, said web portion having a flexing section spaced from said body portion and located adjacent said lip portion.

5. The cup of claim 4 wherein said web portion at said juncture has a thickness T of about one-fourth of the radial distance from said juncture to the inner wall of a pipeline in which the cup is to be used, said web portion having a flexing section intermediate said body and lip portions having a minimum thickness of about one-half of T.

References Cited

UNITED STATES PATENTS

| | | | |
|---|---|---|---|
| 2,750,612 | 6/1956 | Ver Nooy | 15—104.06 |
| 2,906,650 | 9/1959 | Wheaton | 15—104.06 XR |
| 2,909,796 | 10/1959 | Ver Nooy | 15—104.06 XR |
| 2,953,800 | 9/1960 | Bowerman. | |
| 3,025,118 | 3/1962 | Ver Nooy | 15—104.06 XR |
| 3,292,197 | 12/1966 | Stephens | 15—104.06 |

FOREIGN PATENTS 283,460   1/1928   Great Britain.

ROBERT R. MACKEY, Primary Examiner

U.S. Cl. X.R.

137—802; 138—89